Patented Aug. 17, 1937

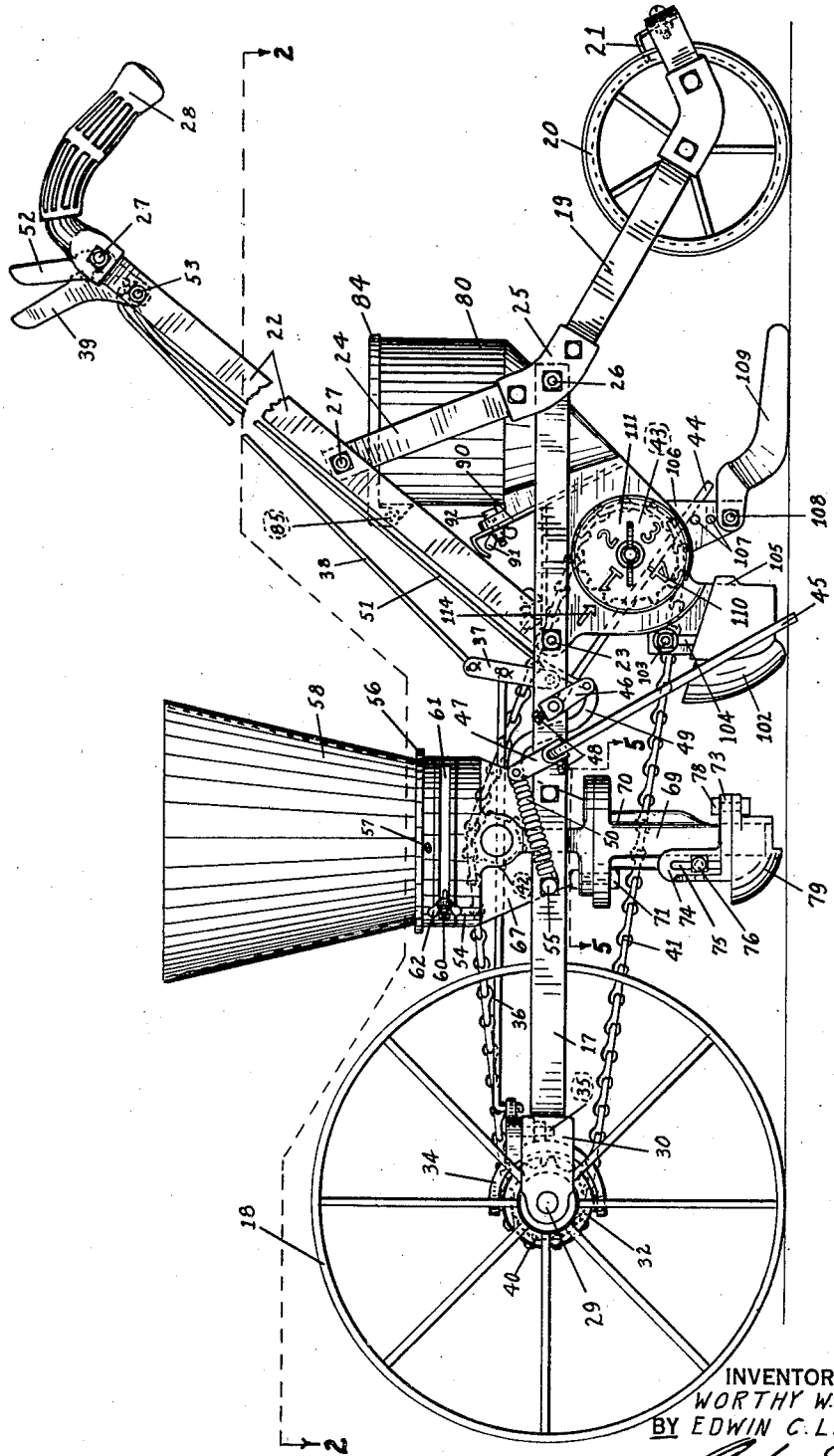

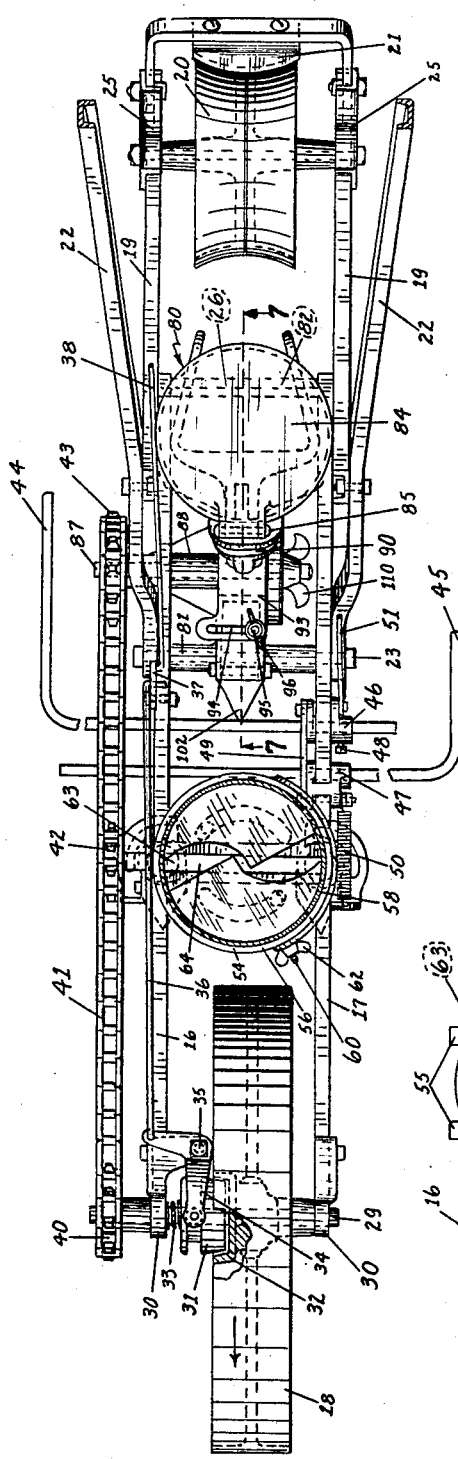

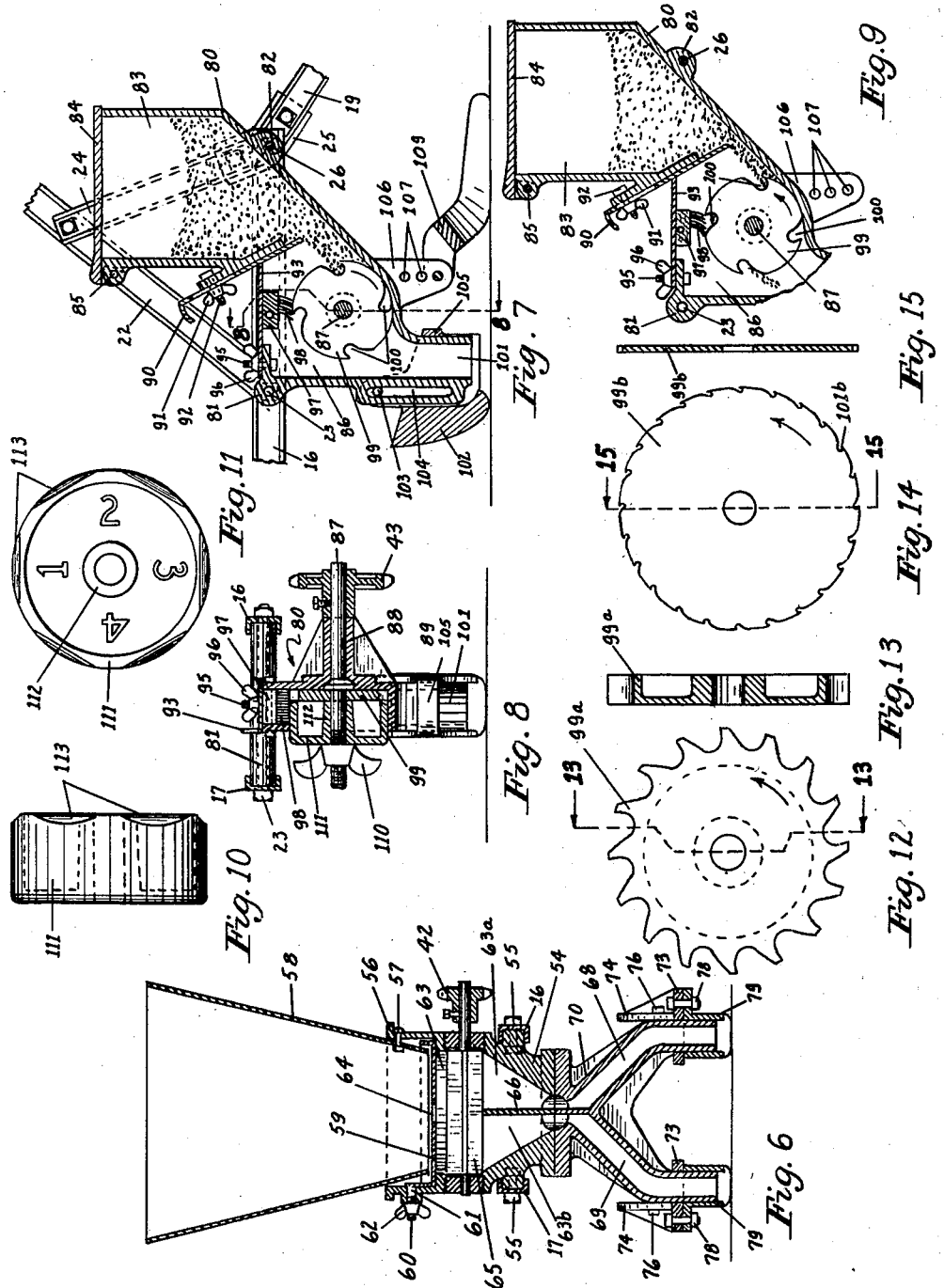

2,090,525

UNITED STATES PATENT OFFICE 2,090,525

COMBINATION SEEDER AND FERTILIZER

Worthy W. Carrier and Edwin C. Leonard, Minneapolis, Minn., assignors to Marvel Seeder Company, Minneapolis, Minn., a corporation of Minnesota Application October 28, 1935, Serial No. 47,038

6 Claims. (Cl. 221—136)

This invention relates to farm or gardening equipment, and the primary object is to provide a manually propelled and controlled machine having an improved seeding mechanism and an improved fertilizer distributor mechanism cooperatively associated and coordinated so as to result in a highly novel, efficient, and practical planter and distributor machine. A further object is to provide in such a machine novel ground or field marker devices that will assist the operator in performing the planting operation in uniformly spaced and even rows. A further object is to provide an efficient, practical, and comparatively simple power transmission for actuating the seeder and fertilizer units, with speed and capacity adjustments whereby the machine can be accurately controlled for various classes of work, and particularly for the planting of numerous varieties of garden seed such as beans, peas, beets, cucumbers, carrots, parsley, spinach, turnips, and other vegetable and garden plants. Still further and more specific objects will be disclosed in the course of the following specification, reference being had to the accompanying drawings, in which:

Fig. 1 is a side elevation of the machine, as seen from the left, and with portions broken away for purpose of convenience in illustration.

Fig. 2 is a plan view of the machine partially in section as on the irregular line 2—2 in Fig. 1.

Fig. 3 is a sectional detail plan view of the fertilizer unit as shown in Fig. 2, but with the feeder plate in an adjusted position to more restrict the passage of material therethrough.

Fig. 4 is a sectional detail elevation through part of the fertilizer unit, as on the line 4—4 in Fig. 3.

Fig. 5 is an enlarged detail plan section on the line 5—5 in Fig. 1, showing lower portion of the fertilizer unit in an adjusted position.

Fig. 6 is a transverse sectional elevation taken entirely through the fertilizer distributor unit, and as seen when looking in a forwardly direction.

Fig. 7 is a longitudinal, sectional elevation through the seed feeding unit, as on the line 7—7 in Fig. 2.

Fig. 8 is a sectional elevation on the line 8—8 in Fig. 7.

Fig. 9 is a sectional elevation similar to the upper portion of Fig. 7, but showing the feed gate in an adjusted position.

Fig. 10 is a detail edge elevation of a cup member which is reversible on the feed shaft adjacent the seed disc.

Fig. 11 is a side elevation of the open side of the cup, as shown in Fig. 10.

Figs. 12, 13, and 14, 15 are, respectively, side elevations of and diametrical sections through representative designs of seed feeding discs, which with a plurality of similar discs are interchangeably employed in the seeder unit depending upon the type of seed to be planted.

Referring to the drawings more particularly and by reference characters, 16 and 17 designate a pair of laterally disposed main frame bars which are supported at their forward ends upon a ground wheel 18, and at their rear are provided with supplemental extensions 19 supported on a rear presser roller or packer wheel 20. The extension is preferably provided with a scraper blade 21 for removing earth which may tend to adhere to the arcuate or concave surface of the packer roller 20.

A pusher or handle frame comprises a pair of upwardly and rearwardly extending beams 22, anchored to the main frame as at 23, and braced with respect thereto by brace bars 24, the lower ends of which are secured to brackets 25 of the extensions 19. Cross bolts 23, and 26, having spacer sleeves upon them, rigidly connect the frame members referred to, and a similar cross bolt 27 rigidly connects the upper ends of the pusher beams 22, adjacent the handles 28 extending rearwardly therefrom. It will be understood that the pusher frame extends sufficiently rearward so that an operator, grasping the handles 28, can conveniently push the vehicle ahead of himself while walking behind the presser wheel 20.

The front wheel 18 is rotatable on a shaft 29, in turn rotatable in bearing brackets 30 of the main frame 16—17. A clutch hub 31 is slidably keyed on the shaft 29, between the right bracket 30 and the hub of wheel 18, which wheel hub has a cooperating clutch member 32 for receiving clutch hub 31. A spring 33 tends to close the clutch members 31, 32, at which time driving contact is established between wheel 18 and shaft 29. The active or inactive driving relation is determined, however, by a bell-crank shipper fork 34 which is fulcrumed at 35 to the bearing bracket 30 adjacent the clutch hub, and is actuated by a rod 36 extending rearwardly to a lever 37. This lever is fulcrumed on the frame beam 16 and is controlled by a second rod 38 which extends up along the pusher frame and connects with a small hand lever 39 that is pivoted to the right pusher beam 22 adjacent the handle thereof. The pivotal connection between members 38 and 39 is such that when the lever is pulled rearwardly to disengage clutch 31—32, it will snap over dead center to form a releasable lock; and when the lever 39 is pushed forwardly it will unlock and permit the spring 33 to close the clutch connection.

The right end of the shaft 29 has a sprocket gear 40 over which passes a sprocket chain 41. This chain also passes over a sprocket pinion 42 of the fertilizer distributor unit, and over a sprocket gear 43 of the seeder unit so as to transmit power to these units. It may be noted that the sprocket gears 40 and 43 are of different sprocket sizes but are interchangeable on their respective shafts so that high and low speeds can be effected without necessitating the use of additional mechanisms.

In order that the seeding may be done in even and uniformly spaced rows we provide a row marker in the form of a pair of L-shaped marker rods 44 and 45 which are simultaneously but reversely adjusted depending upon which side of the machine the field is to be marked. Thus if the operator travels back and forth over the field, planting the rows in succession, the marker on one side will be used while travelling in one direction, while the marker on the other side will be used when travelling in the opposite direction.

The transverse or horizontal portions of the marker rods are rotatable in the frame beams 16—17, while the marker legs are disposed rearwardly and downwardly, as shown in Fig. 1 so that the one in use (45 as shown) will, by a dragging spring action, make a groove or line at one side of the machine which the operator will follow on the return trip, at which time the other marker (44) is moved down to mark the line of next planting.

The marker rods are respectively extended through brackets 46 and 47 in which they are adjustably slidable and secured by set screws 48. The rods are slidably adjustable to allow for adjustments in the spacing between the rows, as with some crops it is necessary that the distance between rows be greater or less than with other crop plantings. Inner arms of the brackets 46 and 47 are connected by a reversely curved link 49 in such a manner that when one of the marker legs is moved down into ground engagement the other will be raised out of ground contact, and vice versa. The outer arm of bracket 47 is connected by a spring 50 to the frame bar 17, and this spring exerts a forward pull on the bracket tending to raise the marker leg 45 and depress the marker leg 44. The outer depending arm of bracket 46 is connected by a pull rod 51 to a hand lever 52, similar to 39, and when this lever is pulled back over the dead center of fulcrum 53, on the left pusher bar 22, it locks the marker arm 45 downwardly against the tension of spring 50, and holds the marker leg 44 up. When starting on the return trip the operator pushes the lever 52 forward, thus permitting the spring 50 to raise marker leg 45 and depress marker leg 44.

Attention is now directed to the fertilizer distributor unit disclosed in Figs. 1 to 6, inclusive. This unit is mounted approximately midway between the front and rear ends of the main frame proper, and comprises a main casting 54 secured between the main frame bars 16—17 by short bolts 55. At its upper end the casting has an upstanding circular flange 56 in which is secured, by bolts 57, the lower end of a downwardly tapered hopper 58. Rotatable within the flange 56 and under the lower edge of the hopper 58 is a feed plate 59 having a peripheral flange projecting upwardly about the lower edge of the hopper. The annular position of the feed plate is adjusted by a short stud bolt 60 projecting outwardly through an arcuate slot 61 in the casting flange 56 and secured by a thumb nut 62.

Immediately below the feed plate 59 the casting 54 has a transverse slot or passageway 63 through which the fertilizer material in the hopper 58 is discharged downwardly to the distributor shoes. Such material must also pass through the slot 64 in the feed plate 59, and this slot is so designed that by rotatably adjusting the feed plate the opening through slots 63 and 64 will be increased or decreased to control the volume flow of material to be discharged. Thus when adjusted as shown in Figs. 3, 4, and 6, only a small amount of material can be released, but when adjusted as shown in Fig. 2 a relatively heavy discharge will result. It will also be noted that the slot 64, in preference to being of straight diametrical design, is formed with two irregular non-radial portions connected by a short diagonal portion. The purpose of this design is to insure a more uniform or equal distribution of material to the opposite sides of the unit than would occur by merely enlarging a central opening, in which event vibration, inadvertent tilting of the machine, variances in material consistency and other factors would have a tendency to at times increase the flow at one side more than the other. Thus, as indicated in Fig. 2, where the slots 63 and 64 define a maximum opening, the opposite end portions are more open than the central portion, and consequently the lateral flows will be partially separated and more uniform as to volume.

A corrugated or longitudinally fluted feed roll 65 is rotatably arranged in the passageway 63 and is driven by the pinion 42 to determine the rate of feed speed, and of course prevents any discharge of fertilizer material except when the machine is in motion. The material discharged by the feed roll 65 drops into two downwardly tapered passages 63a and 63b, separated by a partition 66, which partition is in the same plane with outer reinforcing flanges 67 (Figs. 1, 4, and 5) of the casting 54.

The fertilizer material drops from passages 63a and 63b into hollow angular legs 68 and 69 of a casting 70. This casting is mounted for rotatable adjustment on a vertical axis so that the legs 68 and 69 can be secured either in the transverse positions shown in Figs. 1, 2, and 6, or in an angular position as shown in Fig. 5.

The two castings 54 and 70 are adjustably connected and secured together by bolts 71 which project down through bolt holes in a lower flange of the casting 54 and into arcuate slots 72 (see Fig. 5) in an upper plate flange of the casting 70. By releasing the bolts 71 the casting 70 can be rotated until the legs 68 and 69 are in the angular position desired with respect to the direction of travel, at which time the bolts are tightened up to secure the castings rigidly together.

At their lower ends the vertical portions of the lugs 68 and 69 are provided with small cast rings 73 which encircle the legs and have upstanding arms 74 which are slotted as at 75, and stud bolts 76 extend through these slots and screw into the casting 70 so that the cast rings 73 may be vertically adjusted with respect to the legs 68 and 69 down through which the fertilizer material passes. The rings 73 are provided with arcuate slots 77 through which extend short bolts 78 which fasten a pair of shoes 79 to the rings. Thus by releasing the bolts 78 the shoes may be adjusted about a vertical center, which adjustment depends upon the angularity of the feed legs 68 and 69. The purpose of this adjustment is to enable the operator to adjust the shoes 79 so that they may always point in a forwardly direction and regardless of the position in which the casting 70 is adjusted. It will of course be understood that the shoes 79 function to create a shallow furrow in the ground as the machine progresses over the field, and the fertilizer material is discharged into the furrow or groove thus formed.

When planting certain types of crop it is found advantageous to distribute the fertilizer material at distances more remote from the plant than in other instances. In such cases, and where a maximum spacing between the fertilizer lines is desired, then the distributor legs 68 and 69 are disposed transversely or directly across the machine. Where it is desired, however, to place the fertilizer closer to the crop roots, then the casting 70 is adjusted on its vertical axis so that the discharge legs 68 and 69 will be angularly disposed as shown in Fig. 5, and at such time it becomes necessary to readjust the furrow shoes 79 so that they will point forwardly, and at such time the transverse spacing between the shoes will obviously be considerably less than when the legs 68 and 69 are in the transverse position.

From the foregoing description of the fertilizer unit it will be seen that the feed plate 59 is adjustable to regulate the amount of fertilizer material to be discharged, the design of the slot 64 is such that it cooperates with the slot 63 and the feed roll 65 and partition 66 to insure a uniform distribution of material to both feed legs 68 and 69, and the feed roll 65 serves to effect a uniform discharge of material into the feed legs under the action of the pinion 42 driven by sprocket chain 41 from the front supporting wheel 18; and the feed roll 65 further serves to prevent any accidental or surplus discharge of material into the feed legs except when the machine is moving forwardly under operating conditions. It will also be seen that the adjustment of the casting 70 with respect to casting 54, the adjustment of members 73 vertically with respect to the casting 70, and the rotatable adjustment of the shoes 79 with respect to the member 73, are all coordinated and associated in such a manner that the fertilizer material can be supplied to the ground in any volume desired with a uniform speed of feed, and with an equal distribution of material to both sides of the plant row. The shoe and leg adjustments further make it possible to deposit the fertilizer material at any depth and at any lateral spacing with reference to the crop row, which may be desired.

Attention is now directed to the seed feeding or planting unit shown in Figs. 1, 2, and 7 to 15, inclusive. This unit is similar in many respects to the mechanism disclosed and claimed on our copending application Serial No. 706,727, filed January 15, 1934, for Seed planter, allowed September 3, 1935, and to that extent the present application is a continuation of and substituted for such earlier filed application Serial No. 706,727. This unit comprises a cast housing, designated generally by the numeral 80, and is secured between the main frame beams 16 and 17 at its front and rear ends where it is provided with a pair of transversely extending, integrally formed tubes 81—82, which tubes form the previously noted spacer sleeves for the bolts 23 and 26 respectively. Thus the unit is rigidly secured to the main frame while the integral portions 81 and 82 cooperate with the bolts 23 and 26 to rigidly connect in spaced relations the frame beams 16 and 17. The cast housing 80 includes a seed supply chamber or hopper 83 which is normally closed by a cover 84 hinged as at 85. The housing 80 further includes a second chamber 86 through which extends a feed shaft 87 upon the right outer end of which is secured the sprocket gear 43 driven by the sprocket chain 41 from the ground wheel 18. The shaft 87 extends through a laterally projecting bearing 88 formed integrally with and at one side of the housing 80. This shaft 87, as shown particularly in Fig. 8, has a collar 89 against which the feed discs presently to be described are secured, and against which collar such discs may be rigidly clamped without interfering with the rotary movement of the shaft 87 in the bearing 88. The seed in the hopper or upper chamber 83 escapes into the chamber 86 under the lower end edge of a gate 90 which is mounted for up and down sliding movement so as to control the seed flow passing thereunder, and is adjustably secured by a wing nut 91 of a bolt 92 which projects from a lug of the housing and passes through a slot in the gate 90. The top of the chamber 86 is closed by a slide plate 93 having a transverse slot 94 up through which, from an adjacent housing portion, extends a short bolt 95 having a wing nut 96, which, when screwed down, will tighten the plate 93 in place. When it is desired, for inspection purposes or to clear the chamber of obstructions, the nut 96 is loosened to release the plate 93, whereupon the latter may be moved transversely on the bolt 95 to open the chamber.

Immediately under the plate 93 the chamber 86 is provided with a cross piece 97, preferably made of wood or fibre, and serving as a support for a tuft of brush bristles 98, which bristles contact with the peripheral surface of the seed feeding discs to sweep back any seed surplus projecting above the peripheral surface of the feeding discs. The feeding disc 99 rotates with the shaft 87 in a counter-clockwise direction, as indicated by the arrows in Figs. 7 and 9, and is provided with a series of peripheral notches or indents 100 which, as the disc rotates, pick up a small portion of seed from the supply traveling down under the gate 90 and carry such individual supplies up over the shaft 87 under the brush 98, and then drop them down into a delivery leg 101, also formed as an integral part of the housing casting 80. This leg 101 is provided with a vertically adjustable shoe 102 which is secured to the leg by a bolt 103 operating in a slot 104, and in which the bolt is adjustable upon being released to regulate the operative depth of the furrow forming shoe 102 in the ground. The shoe 102 is provided with an integral loop or strap portion 105 which passes about the rear of the boot 101.

Rearwardly of the boot the housing 80 is provided with a depending lug 106 having a series of perforations 107 selectively engageable by a connecting pivot bolt 108 of a coverer 109, which is a casting having rearwardly converging lateral wings or side portions which rest with their own weight on the ground; and as the machine moves forwardly these wings engage the loose earth pushed up by the shoe 102 and tend to return such loose earth to its original condition, thereby covering the seed which has dropped into the furrow through the boot 101. By selectively placing the bolt 108 in the vertically spaced perforations 107 the action and effect of this coverer member can be controlled.

As shown in Figs. 7 and 9, the seed feeding disc 99 is provided with four circumferentially spaced and comparatively large pockets 100. This design of disc and arrangement of pockets is used in the planting of certain kinds of seed. It is obvious, however, that in planting other sizes and varieties of seed, discs of different types will have to be used. Thus in Figs. 12-13 we have shown a disc 99a having a larger number of feed pockets and which will of course convey a greater amount of seed and at more frequent intervals. Where the interval between seed planting, which of course determines the spacing of the seed in the crop row, is desired to be greater, then a seed disc with only one or two conveyor pockets may be used. When the seed species being planted is very small, then a disc such as 99b, as shown in Figs. 14 and 15, may be used, and in this case the pockets 101b are not only much smaller, but it will also be noted that the disc itself is considerably thinner. In order to provide a machine that is adaptable for all types of garden seed and under various planting conditions, it is desirable to provide a series of discs, fifteen or twenty if necessary, all having different patterns and adapted for different specific uses. It may be noted that the lower parts of the discs move rearwardly and upwardly in an arcuate recess or concavity formed in or by the slanting housing wall which extends from the chamber 83 to the leg 101 to support the downward seed flow and thus facilitates the picking up of the seed therefrom.

It may here be explained that the gate 90 has a very important function in connection with the operation of the seed feeding discs, inasmuch as it not only controls the flow of seed from chamber 83 to chamber 86, but also is utilized to affect the amount of seed passing into the feed pockets 100 as they travel upwardly through the seed supply. Thus, as shown in Fig. 7, the gate 90 is in a relatively high position, at which time the supply of grain or seed passing thereunder and into contact with the disc 99 is relatively greater than for instance as shown in Fig. 9, where the gate 90 is in a lowered position. Consequently, with the gate adjusted as shown in Fig. 7, the pockets 100 will pick up a greater number of seed particles than under the conditions exemplified in Fig. 9, where, because of the comparatively small or thin grain flow, the pockets will pick up a more limited number of seed particles. The disc 99 (99a, 99b, etc.,) is secured upon the shaft 87 by a wing nut 110 between which and the disc is provided a cup member 111, and this cup may be placed upon the shaft 87 with its open side directed inward, as indicated in Fig. 8, or with its open side directed outwardly, in which event the nut 110 would contact directly with the hub 112 formed integrally with the cup. The cup serves several purposes, one of which is to close the housing opening through which the disc must pass when being placed upon the shaft and moved into operative position, and will maintain this closed position regardless of the thickness of disc being used. It will be noted that the cup 111 is provided at one edge with a series of circumferentially spaced, beveled surfaces 113, the purpose of which is to give a slight agitating action to the grain coming in contact therewith as it moves downwardly from the chamber 83; and this agitation has the effect of more uniformly distributing the grain into the various pockets 100. Under certain conditions it is not desirable to produce this agitating effect, in which event the cup is merely reversed on the shaft 87 so that the beveled surfaces 113 will project outwardly and have no effect on the grain body within the chamber 86.

The flat vertical wall of the cup is provided, on both faces, with diametrically opposed numerals such as "1", "2", "3", and "4", as shown in Figs. 1 and 11 and these numerals can be conveniently provided by integral embossments when the cup is cast. These numerals are exposed to view and are readably associated with an arrow 114 (Fig. 1) on the side of housing 80, to enable the operator to reset or determine the planting interval when it is desired to plant the seed at predetermined and corresponding intervals in all rows for purpose of cross checking or subsequent cross cultivation. Under ordinary planting and uninterrupted travel conditions this feature is of no substantial consequence. It is frequently found, however, that when planting a field the operator must stop and sometimes pull back the machine to avoid or remove obstructions to normal travel movement, and when such a contingency arises he can first determine the relative position of the seed disc with respect to the last seed deposit, and then regardless of what intervening adjustments or movements have been made is able to reset the machine so that when the planting operation is again started the work can be resumed without disturbing or changing the regularity of the seed plantings in either longitudinal or cross alignment.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a planter, a hopper having a downwardly and forwardly sloping bottom, and an opening in the rear part of its front wall, a casing having the top part of its rear portion connected with the bottom part of the front portion of the hopper, with said parts being in communication with each other through the opening, a spout depending from the front portion of the casing and said casing having a downwardly and forwardly sloping bottom which forms a continuation of the hopper bottom and which extends to the spout, an intermediate portion of the bottom of the casing having a slight concavity therein, a seed wheel having pockets in its periphery rotatably mounted in the casing with a portion of the wheel extending into the concavity, a downwardly and rearwardly sloping flange connected with the front part of the hopper, a gate slidably arranged on the front face of the flange for controlling the opening, said casing having a top opening extending rearwardly to the gate, a transversely adjustable slide cover for the casing opening having its rear edge abutting and closing tightly against the gate when the cover is in closing position, and means for rotating the wheel to cause the pockets to pick up seeds in rear of the concavity and deposit them into the spout.

2. In a planter, a hopper, a planter leg, a feed chamber arranged to receive seed from the hopper, a rotatable shaft journaled transversely in the chamber and adapted to interchangeably receive and turn peripherally notched seed discs selectively placed endwise on the shaft, said shaft having a stop for engaging one side of the received disc, such discs upon being rotated by the shaft being operative to pick up seed in the chamber and discharge such seed into the planter leg, the feed chamber having a lateral circular opening concentric with the shaft and through which the interchangeable discs may be passed when placed on or removed from the shaft, and means axially adjustable in and for closing the lateral chamber opening, said means being operative against the side of the received disc opposite from the stop to clamp the disc against the stop and thereby secure the disc for rotation with the shaft.

3. In a planter, a hopper, a planter leg, a feed chamber arranged to receive seed from the hopper, a rotatable shaft journaled transversely in the chamber and adapted to interchangeably receive and turn peripherally notched seed discs selectively placed endwise on the shaft, a stop on the shaft for contact by one side of the received disc, such discs upon being rotated by the shaft being operative to pick up seed in the chamber and discharge such seed into the planter leg, the feed chamber having a lateral circular opening concentric with the shaft and through which the interchangeable discs may be passed when placed on or removed from the shaft, means, axially adjustable on and rotatable with the shaft, for engaging in and closing the opening, and threaded means on the shaft for engaging the closing means to press the selected disc against said stop and thereby secure the disk for rotation with the shaft.

4. In a planter, a hopper, a planter leg, a feed chamber arranged to receive seed from the hopper, a rotatable shaft journaled transversely in the chamber and adapted to interchangeably receive and turn peripherally notched seed discs selectively placed endwise on the shaft, a stop on the shaft for laterally engaging the received disc, such discs upon being rotated by the shaft being operative to pick up seed in the chamber and discharge such seed into the planter leg, the feed chamber having a lateral circular opening concentric with the shaft and through which the interchangeable discs may be passed when placed on or removed from the shaft, means for closing the lateral chamber opening, said closing means being mounted on the shaft and including a cylindrical flange portion extending through the opening and with its outer surface in effective closing contact with the chamber edge defining the circular opening therein, and a nut threaded on the shaft for engaging the closing means and pressing it and the received disc toward the shaft stop to thereby clamp the disc with respect to and for rotation with the shaft.

5. In a planter, a hopper, a planter leg, a feed chamber arranged to receive seed from the hopper, a rotatable shaft journaled at one end in one side wall of the chamber and extending transversely therewithin, the feed chamber having a circular opening in the other side wall, concentric with and substantially larger than the shaft, said shaft being arranged to receive peripherally notched seed discs of different thicknesses interchangeably and selectively placed on the shaft and moved into the chamber through said circular opening, and means laterally engaging the selected disc for closing the opening including a cylindrical member rotatably fitting and axially adjustable in the opening whereby the opening will be closed when the closing means engages the disc of any predetermined thickness.

6. In a planter, a housing having a seed hopper and a seed feed chamber connected therewith by a seed passageway defined in part by an inclined support portion down upon which seed may flow from the hopper to the chamber, a planter leg connected to the chamber, a rotatable feed member for transferring seed in the chamber to the planter leg, an inclined, adjustable gate slidably secured in the housing for opening and closing movement with respect to said support to control the seed flow downwardly thereover, and a cover plate for the feed chamber adjustable in a transverse direction and disposed with its rear edge adjacent to and in face contact with the gate.

WORTHY W. CARRIER.
EDWIN C. LEONARD.